United States Patent
Chou et al.

(10) Patent No.: US 12,509,804 B2
(45) Date of Patent: Dec. 30, 2025

(54) MANUFACTURING METHOD FOR CARBON FIBER

(71) Applicant: FORMOSA PLASTICS CORPORATION, Kaohsiung (TW)

(72) Inventors: Wen-Ju Chou, Kaohsiung (TW); Ching-Wen Chen, Kaohsiung (TW); Kun-Yeh Tsai, Kaohsiung (TW); Chia-Chi Hung, Kaohsiung (TW); Chia-Chun Hsieh, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 774 days.

(21) Appl. No.: 17/868,333

(22) Filed: Jul. 19, 2022

(65) Prior Publication Data
US 2023/0034175 A1    Feb. 2, 2023

(30) Foreign Application Priority Data

Jul. 19, 2021    (TW) ................. 110126508

(51) Int. Cl.
  *D01F 9/22*    (2006.01)
(52) U.S. Cl.
  CPC ..................... *D01F 9/22* (2013.01)
(58) Field of Classification Search
  CPC ..... D01F 9/22; D01F 6/38; D01F 6/18; C08F 2/06; C08F 120/44; C08F 220/46; C08F 222/02
  See application file for complete search history.

(56) References Cited

U.S. PATENT DOCUMENTS

2015/0174807 A1* 6/2015 Tang ............... C08L 33/20
                                                        526/225
2018/0354899 A1   12/2018 Murano et al.

FOREIGN PATENT DOCUMENTS

| CN | 103614800 A | 3/2014 |
|----|-------------|--------|
| CN | 104562265 A | 4/2015 |
| CN | 104891591 A | 9/2015 |
| CN | 105200566 A | 12/2015 |
| EP | 3388418 A1 | 10/2018 |
| JP | H11200140 A | 7/1999 |
| JP | 2002161114 A | 6/2002 |
| JP | 2011213773 A | 10/2011 |
| JP | 201272248 A | 4/2012 |
| JP | 2017019762 A | 1/2017 |
| KR | 101365142 | 2/2014 |
| KR | 20140013174 A | 2/2014 |
| TW | 201529612 A | 8/2015 |
| WO | WO2020102735 | 5/2020 |

* cited by examiner

*Primary Examiner* — Daniel C. McCracken
(74) *Attorney, Agent, or Firm* — MUNCY, GEISSLER, OLDS & LOWE, P.C.

(57) ABSTRACT

A manufacturing method for a carbon fiber includes the following steps. A first monomer and a second monomer are dissolved in a first solvent, and a polymerization reaction is performed to form a copolymerized polymer, in which the first monomer includes acrylonitrile, the second monomer has an unsaturated bond, the first solvent includes dimethyl sulfoxide, and based on 100 wt % of the first solvent, a content of the dimethyl sulfoxide is between 99.9 wt % and 100 wt %. A spinning step is performed on the copolymerized polymer.

18 Claims, 1 Drawing Sheet

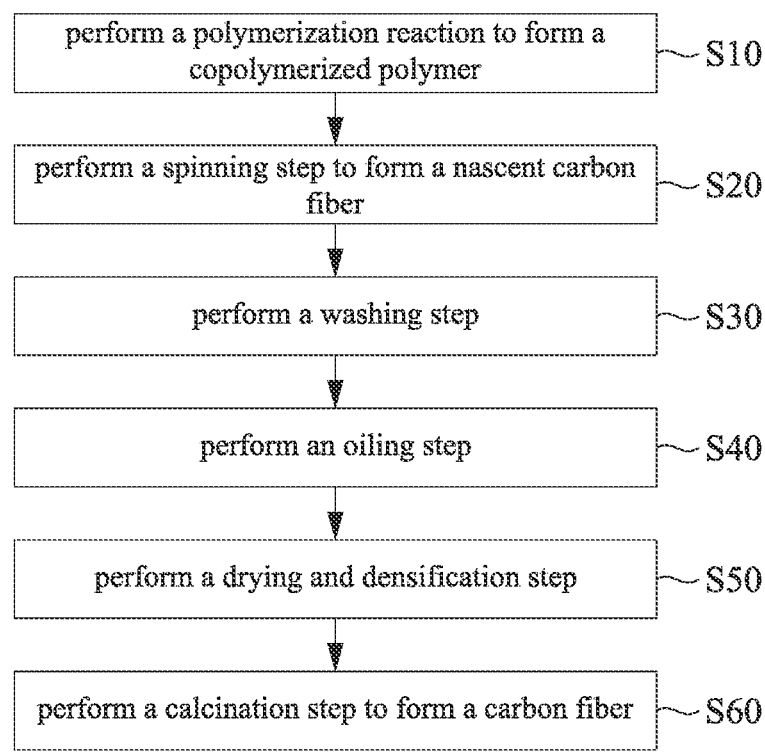

MANUFACTURING METHOD FOR CARBON FIBER

CROSS-REFERENCE TO RELATED APPLICATION

This application claims priority to Taiwan Application Serial Number 110126508, filed Jul. 19, 2021, which is herein incorporated by reference.

BACKGROUND

Field of Disclosure

The present disclosure relates to a manufacturing method for a carbon fiber.

Description of Related Art

In recent years, with the rising awareness of environmental protection, energy saving, and high efficiency, the demand for carbon fiber is getting higher. Since carbon fiber has the advantages of high fatigue resistance, high thermal conductivity, low friction coefficient, high lubricity, low thermal expansion coefficient, high corrosion resistance, high X-ray transmittance, and specific heat and electrical conductivity between non-metals and metals, etc., it is widely used in fields such as industry, sports, civil construction, transportation, energy, aerospace and military. However, in the manufacturing process of carbon fibers, the mechanical strength, other physical properties, and other chemical properties of different carbon fibers are different based on the difference of precursors, process, and carbonization conditions.

At present, polyacrylonitrile (PAN)-based precursor fibers are commonly used to prepare carbon fibers, and the quality of the polyacrylonitrile-based precursor fibers often directly affects the quality of the carbon fibers (e.g., the properties of the carbon fibers, such as mechanical strength). Therefore, how to manufacture high-quality polyacrylonitrile-based precursor fibers is an important issue for researchers in this field.

SUMMARY

According to some embodiments of the present disclosure, a manufacturing method for a carbon fiber includes the following steps. A first monomer and a second monomer are dissolved in a first solvent, and a polymerization reaction is performed to form a copolymerized polymer, in which the first monomer includes acrylonitrile, the second monomer has an unsaturated bond, the first solvent includes dimethyl sulfoxide, and based on 100 wt % of the first solvent, a content of the dimethyl sulfoxide is between 99.9 wt % and 100 wt %. A spinning step is performed on the copolymerized polymer.

In some embodiments of the present disclosure, the first solvent further includes methylsulfonylmethane and dimethyl sulfide, and based on 100 wt % of the first solvent, a content of the methylsulfonylmethane is less than or equal to 0.0004 wt %, and a content of the dimethyl sulfide is less than or equal to 0.0008 wt %.

In some embodiments of the present disclosure, the acid value of the first solvent is less than or equal to 0.02 KOH mg/g, and the base value of the first solvent is less than or equal to 0.01 $HClO_4$ mg/g.

In some embodiments of the present disclosure, a polymerization conversion degree of the polymerization reaction is between 90% and 100%.

In some embodiments of the present disclosure, a falling ball viscosity of the copolymerized polymer is between 400 seconds and 700 seconds.

In some embodiments of the present disclosure, a weight-average molecular weight of the copolymerized polymer is between 300,000 g/mole and 500,000 g/mole.

In some embodiments of the present disclosure, a dispersibility index of the copolymerized polymer is between 1.5 and 3.0.

In some embodiments of the present disclosure, the manufacturing method for the carbon fiber further includes the following step. The copolymerized polymer is dissolved in a second solvent, in which a weight percent concentration of the copolymerized polymer in the second solvent is between 18% and 25%.

In some embodiments of the present disclosure, the spinning step includes the following steps. A reeling-off step is performed on the copolymerized polymer dissolved in the second solvent to form a filamentous copolymerized polymer. A condensing step is performed on the filamentous copolymerized polymer by using a condensing bath to form a nascent carbon fiber, in which the condensing bath contains a condensing liquid, the condensing liquid includes the dimethyl sulfoxide, and based 100 wt % of the condensing liquid, a content of the dimethyl sulfoxide is between 20 wt % and 50 wt %.

In some embodiments of the present disclosure, based on 100 wt % of the first monomer and the second monomer, a content of the first monomer is between 95 wt % and 100 wt %.

According to some other embodiments of the present disclosure, a manufacturing method for a carbon fiber includes the following steps. A first monomer and a second monomer are dissolved in a first solvent, and a polymerization reaction is performed to form a copolymerized polymer, in which based on 100 wt % of the first monomer and the second monomer, a content of the first monomer is between 99 wt % and 100 wt %, the first solvent includes dimethyl sulfoxide, and based on 100 wt % of the solvent, a content of the dimethyl sulfoxide is between 99.9 wt % and 100 wt %. A spinning step is performed on the copolymerized polymer.

In some embodiments of the present disclosure, the first monomer includes acrylonitrile, and the second monomer has an unsaturated bond.

In some embodiments of the present disclosure, the first solvent further includes methylsulfonylmethane and dimethyl sulfide, and based on 100 wt % of the first solvent, a content of the methylsulfonylmethane is less than or equal to 0.0004 wt %, and a content of the dimethyl sulfide is less than or equal to 0.0008 wt %.

In some embodiments of the present disclosure, the acid value of the first solvent is less than or equal to 0.02 KOH mg/g, and the base value of the first solvent is less than or equal to 0.01 $HClO_4$ mg/g.

In some embodiments of the present disclosure, a polymerization conversion degree of the polymerization reaction is between 90% and 100%.

In some embodiments of the present disclosure, a falling ball viscosity of the copolymerized polymer is between 400 seconds and 700 seconds.

In some embodiments of the present disclosure, a weight-average molecular weight of the copolymerized polymer is between 300,000 g/mole and 500,000 g/mole.

In some embodiments of the present disclosure, a dispersibility index of the copolymerized polymer is between 1.5 and 3.0.

In some embodiments of the present disclosure, the manufacturing method for the carbon fiber further includes the following step. The copolymerized polymer is dissolved in a second solvent, in which a weight percent concentration of the copolymerized polymer in the second solvent is between 18% and 25%.

In some embodiments of the present disclosure, the spinning step includes the following steps. A reeling-off step is performed on the copolymerized polymer dissolved in the second solvent to form a filamentous copolymerized polymer. A condensing step is performed on the filamentous copolymerized polymer by using a condensing bath to form a nascent carbon fiber, in which the condensing bath contains a condensing liquid, the condensing liquid includes the dimethyl sulfoxide, and based 100 wt % of the condensing liquid, a content of the dimethyl sulfoxide is between 20 wt % and 50 wt %.

According to the aforementioned embodiments of the present disclosure, since the first solvent of the present disclosure has a high content of dimethyl sulfoxide, the purity of the first solvent is high, such that the copolymerized polymer formed in the first solvent can have good performance in purity, molecular weight, spinnability, crystallinity, polymerization conversion degree, mechanical strength, and other properties.

BRIEF DESCRIPTION OF THE DRAWINGS

The disclosure can be more fully understood by reading the following detailed description of the embodiments, with reference made to the accompanying drawings as follows:

The sole drawing is a flowchart illustrating a manufacturing method for a carbon fiber according to some embodiments of the present disclosure.

DETAILED DESCRIPTION

Reference will now be made in detail to the present embodiments of the disclosure, examples of which are illustrated in the accompanying drawings. However, it should be understood that these details should not be intend to limit the present disclosure. That is, in some embodiments of the present disclosure, these practical details are unnecessary, and therefore should not be used to limit the present disclosure.

Reference is made to the drawing, in which the drawing is a flowchart illustrating a manufacturing method for a carbon fiber according to some embodiments of the present disclosure. The manufacturing method for the carbon fiber of the present disclosure includes steps S10 to S60. In step S10, a polymerization reaction is performed to form a copolymerized polymer. In step S20, a spinning step (the spinning step includes a reeling-off step and a condensing step) is performed to form a nascent carbon fiber. In step S30, a washing step is performed. In step S40, an oiling step is performed. In step S50, a drying and densification step is performed. In step S60, a calcination step is performed to form the carbon fiber. In the following description, the above-mentioned steps will be further explained.

Firstly, in step S10, a first monomer and a second monomer are dissolved in a first solvent, and a polymerization reaction is performed to form a copolymerized polymer. The first monomer used in the present disclosure includes acrylonitrile, and the second monomer has an unsaturated bond. Specifically, the second monomer may be, for example, acrylic acid, methacrylic acid, acrylamide, methyl acrylate, ethyl acrylate, methyl methacrylate, n-butyl acrylate, isobutyl acrylate, vinyl acetate, ethyl methacrylate, isopropyl methacrylate, isobutyl acrylate, n-butyl methacrylate, n-hexyl methacrylate, 2-hydroxyethyl methacrylate, cyclohexyl methacrylate, itaconic acid, citric acid, maleic acid, mesaconic acid, crotonic acid, styrene, vinyltoluene, vinyl chloride, vinyl fluoride, vinylidene chloride, vinyl bromide, vinylidene fluoride, allyl sulfonic acid, styrene sulfonic acid, or an amine salt or ester derivative of any of the above compounds. In some embodiments, the second monomer may, for example, preferably be the itaconic acid when considering the solubility of the copolymerized polymer in the solvent, the compactness of fibers, and the function of promoting the oxidation reaction in the stabilization process.

In some embodiments, based on 100 wt % of the first monomer and the second monomer, a content of the first monomer may be between 95 wt % and 100 wt %. That is, a content of the second monomer may be less than 5 wt %. In the above-mentioned content range, the first monomer has a high content, such that the carbon fiber precursor (which will be further described later) formed later can be free from defects during the subsequent calcination step, so as to improve the mechanical strength of the carbon fiber. In detail, when the content of the first monomer is less than 95 wt %, it may cause the carbon fiber precursor to lose too much mass during the calcination step, which easily leads to the generation of defects. In some preferred embodiments, based on 100 wt % of the first monomer and the second monomer, a content of the first monomer may be between 99 wt % and 100 wt %. That is, a content of the second monomer may be less than 1 wt %, so as to better achieve the above effect, such that the carbon fiber is provided with better mechanical strength.

The first solvent of the present disclosure includes dimethyl sulfoxide (DMSO), and based on 100 wt % of the first solvent, a content of the dimethyl sulfoxide is between 99.9 wt % and 100 wt %. Specifically, the purity of the first solvent (i.e., the content of dimethyl sulfoxide referred in the present disclosure) and the quality of the first solvent affect the purity, molecular weight, spinnability, crystallinity, and polymerization conversion degree, mechanical strength, and other properties of the copolymerized polymer produced by the polymerization reaction, and when the content of the dimethyl sulfoxide in the first solvent is in the above range, it means that the first solvent has a high purity, and therefore the copolymerized polymer formed in the first solvent can have good performance in the above characteristics. In detail, when the content of dimethyl sulfoxide is less than 99.9 wt %, the purity and the molecular weight of the copolymerized polymer produced by the polymerization reaction may be too low, the spinnability and crystallinity of the copolymerized polymer may be poor, and the polymerization conversion degree may be too low, resulting in low mechanical strength of the finally formed carbon fiber.

In some embodiments, the first solvent further includes methylsulfonylmethane and dimethyl sulfide, and based on 100 wt % of the first solvent, a content of the methylsulfonylmethane may be less than or equal to 0.0004 wt %, and a content of the dimethyl sulfide may be less than or equal to 0.0008 wt %. Specifically, since dimethyl sulfoxide can be produced by the oxidation of dimethyl sulfide, and there are often incompletely reacted dimethyl sulfide and methylsulfonylmethane which is formed by unnecessary oxidation of dimethyl sulfoxide during the production process, if the contents of the methylsulfonylmethane and dimethyl sulfide is too high, the purity and quality of the first solvent will be affected, resulting in excessively low purity, excessively low molecular weight, poor spinnability and crystallinity, and excessively low polymerization conversion degree of the copolymerized polymer produced by the polymerization reaction, which further result in low mechanical strength of the finally formed carbon fiber. The present disclosure ensures that the carbon fiber has high mechanical strength by controlling the contents of the methylsulfonylmethane and dimethyl sulfide to be within the above-mentioned ranges. Specifically, when the content of methylsulfonylmethane is greater than 0.0004 wt % and/or the content of dimethyl sulfide is greater than 0.0008 wt %, the mechanical strength of the subsequently formed carbon fiber will be too low. In some other embodiments, the first solvent of the present disclosure may also be, for example, organic solvents such as dimethylformamide, dimethylacetamide, or a combination thereof; or an aqueous solution of inorganic salts such as zinc dichloride, sodium thiocyanate, or a combination thereof.

In some embodiments, an acid value of the first solvent may be less than or equal to 0.02 KOH mg/g, and a base value of the first solvent may be less than or equal to 0.01 $HClO_4$ mg/g. Specifically, the dimethyl sulfoxide that is recycled and reused through the process is prone to produce methanesulfonic acid, which causes the acidity of the first solvent to be too high, resulting in the molecular weight of the copolymerized polymer formed in the first solvent being too low. This results in poor spinnability and crystallinity, further resulting in low mechanical strength of the carbon fiber finally formed. The present disclosure ensures that the carbon fiber has higher mechanical strength by controlling the acid value and the base value of the first solvent within the above ranges. In more detail, when the acid value of the first solvent is greater than 0.02 KOH mg/g and/or the base value of the first solvent is greater than 0.01 $HClO_4$ mg/g, the mechanical of the subsequently formed carbon fibers may be too low.

During the step S10, a solution polymerization method, a suspension polymerization method, or an emulsion polymerization method can be applied to carry out the polymerization reaction, and preferably, a solution polymerization method can be applied. Specifically, the first monomer, the second monomer, and the first solvent can be put into a stirred type polymerization tank at once, and can be stirred and undergo a polymerization reaction under certain reaction conditions, so as to obtain the copolymerized polymer. In some embodiments, the reaction temperature of the polymerization reaction may be between 60° C. and 90° C. to improve the polymerization conversion degree. In some embodiments, the polymerization conversion degree of the polymerization reaction can be between 90% and 100%, such that the molecular weight distribution of the copolymerized polymer formed is within a certain range, thereby reducing the possibility of forming defects in the subsequently formed carbon fiber and improving the mechanical strength of carbon fiber. In detail, when the polymerization conversion degree is less than 90%, there may be too many impurities such as oligomers and/or polymers in the subsequent spinning solution, and the oligomers may not only destroy the tacticity of the copolymerized polymer, but also produce a large amount of decomposition products and tar-like substances in the subsequent pre-oxidation step, resulting in defects of the carbon fiber. On the other hand, polymers will lead to the formation of a gel structure during the polymerization reaction, which is not conducive to the polymerization reaction, and cannot meet the manufacturing requirements of the carbon fiber with good performance (e.g., high mechanical strength).

In some embodiments, the polymer dispersity index (PDI) of the copolymerized polymer may be between 1.5 and 3.0 to improve the processability of the spinning step, reduce the possibility of carbon fiber defects, and improve the mechanical strength of carbon fiber. In detail, when the dispersibility index of the copolymerized polymer is greater than 3.0, it may cause the carbon fiber to fail to have high mechanical strength due to the generation of defects; when the dispersibility index of the copolymerized polymer is less than 1.5, it may lead to excessive processing limitations in the subsequent spinning step, which is not conducive to the subsequent spinning step. In some embodiments, a weight-average molecular weight of the copolymerized polymer may be between 300,000 g/mole and 500,000 g/mole, so as to improve the processability of the subsequent spinning step and improve the mechanical strength of the carbon fiber. In detail, when the weight-average molecular weight of the copolymerized polymer is less than 300,000 g/mole, it may cause the spinning solution to be difficult to further shape through the spinning step due to the low viscosity of the copolymerized polymer, which is not conducive to the formation of the carbon fiber with high mechanical strength; when the weight-average molecular weight of the copolymerized polymer is greater than 500,000 g/mole, it may cause the spinning solution to block the spinning nozzle due to the high viscosity of the copolymerized polymer, and it may be difficult for the spinning solution to reel off, which are not conducive to the formation of the carbon fiber with high mechanical strength.

In some embodiments, a falling ball viscosity of the copolymerized polymer can be between 400 seconds and 700 seconds, such that the copolymerized polymer has good extensibility and solubility to facilitate the subsequent reeling-off, condensing, and extension steps, so as to improve the mechanical strength of the carbon fiber. In detail, when the falling ball viscosity is lower than 400 seconds, it means that the strength of the copolymerized polymer is insufficient, and a high-degree extension cannot be carried out, which will easily lead to insufficient mechanical strength of the final carbon fiber; when the falling ball viscosity is higher than 700 seconds, it means that the solubility of the copolymerized polymer is poor, and broken filaments tend to form during the condensing step, leading to difficulties in performing the spinning step.

Next, in step S20, a spinning step is performed to form a nascent carbon fibers. Specifically, the spinning step may include a reeling-off step and a condensing step in sequence. Firstly, the copolymerized polymer can be dissolved in a second solvent with a suitable concentration to form a spinning solution, and then the spinning solution can be subjected to a spinning step to form a filamentous copolymerized polymer. In some embodiments, the second solvent may be, for example, an organic solvent such as dimethylformamide, dimethylacetamide, dimethyl sulfoxide, or combinations thereof. In some other embodiments, the second solvent may be, for example, an aqueous solution of inorganic salts such as zinc dichloride, sodium thiocyanate, or a combination thereof. It should be understood that the type of the second solvent should be selected to be the same as the type of the first solvent. For example, when the first solvent includes dimethyl sulfoxide, the second solvent should also include dimethyl sulfoxide. As another example, when the first solvent includes dimethylformamide, the second solvent should also include dimethylformamide. In some embodiments, a weight percent concentration of the copolymerized polymer in the second solvent may be between 18% and 25%, so as to facilitate the spinning step to form the filamentous copolymerized polymer with appropriate compactness. In detail, when the weight percent concentration of the copolymerized polymer in the second solvent is less than 18%, the spinning solution cannot withstand high-degree extension, and the filamentous copolymerized polymer obtained by spinning has a loose structure, which leads to low mechanical strength of the carbon fiber; when the weight percent concentration of the copolymerized polymer in the second solvent is greater than 25%, the second solvent has insufficient dissolving ability to the copolymerized polymer, resulting in poor uniformity and high viscosity of the spinning solution, which further causes spinning problems such as low fluidity of the spinning solution, which is not conducive to the stability of the spinning step.

Next, a process of dry-jetting wet-spinning or wet-jetting wet-spinning can be carried out to perform a condensing step on the filamentous copolymerized polymer, such that a nascent carbon fiber is formed. Specifically, the condensing step can be performed on the filamentous copolymerized polymer by using a condensing bath, so as to spit out the nascent carbon fiber in the condensing bath. By adjusting the concentration of the condensing liquid in the condensing bath, the temperature of the condensing step (the temperature of the condensing liquid), the pulling tension and the extension ratio at the outlet of the condensing bath, etc., the pore size of the pore in the nascent carbon fiber can be controlled. In some embodiments, the condensing solution may include an aqueous solution dissolving dimethyl sulfoxide, and based on 100 wt % of the condensing solution, a content of dimethyl sulfoxide is between 20 wt % and 50 wt %. In detail, when the content of dimethyl sulfoxide is less than 20 wt %, the precipitation of the filamentous copolymerized polymer from the condensing solution may be too fast, resulting in a loose structure and a large surface pore size of the nascent carbon fiber; when the content of dimethyl sulfoxide is greater than 50 wt %, the condensing of the filamentous copolymerized polymer in the condensing solution may be too slow, resulting in the failure of the nascent carbon fiber to be fully condensed, such that the nascent carbon fibers are stuck (adhered) together during subsequent steps such as washing and extension. In some embodiments, the temperature of the condensing step may be between 3° C. and 40° C., so as to improve the compactness of the nascent carbon fibers and control the pore size of the nascent carbon fiber to be within a suitable range. In detail, when the condensing temperature is less than 3° C., the pore size of the nascent carbon fiber may be smaller than the target range; when the condensing temperature is higher than 40° C., the structure of the nascent carbon fiber may be too loose, which is not conducive to the formation of the carbon fiber with high mechanical strength.

Subsequently, in step S30, a washing bath may be used to perform a (water) washing step on the nascent carbon fiber. By adjusting the concentration of the washing solution in the washing bath, the temperature of the washing step (the temperature of the washing solution), and other conditions, the adhesion of single fibers can be avoided, and the pore size of the nascent carbon fiber can be controlled. In some embodiments, the washing bath may include an aqueous solution (also known as a washing solution) dissolving dimethyl sulfoxide, and based on 100 wt % of the aqueous solution, a content of dimethyl sulfoxide may be between 1 wt % and 10 wt %. In some embodiments, a temperature of the washing step can be between 70° C. and 90° C., and when a multi-stage washing step is carried out, the temperature of the last stage of the washing step can be further increased to be between 90° C. and 95° C. In some preferred embodiments, in order to avoid the remaining solvent to form unnecessary pores in the nascent carbon fiber, the temperature of the washing step is preferably 100° C. (i.e., the washing solution is in a boiling state). In some embodiments, before the washing step, the nascent carbon fiber may be subjected to an extension step to extend the nascent carbon fiber by applying an extension ratio of 2 to 5 times. Specifically, the extension step can be performed by stretching the nascent carbon fiber in a high-temperature hot roller, a high-temperature hot plate, or a high-temperature and high-pressure steam. In some preferred embodiments, a multi-stage extension step and a multi-stage washing step may be performed, and the multi-stage extension step and the multi-stage washing step may be performed, for example, alternately.

Next, in step S40, an oiling step is performed on the nascent carbon fiber, and in step S50, a drying and densification step is performed on the oiled nascent carbon fiber using a hot roller. In some embodiments, a temperature of the drying and densification step may be adjusted according to a moisture content of the nascent carbon fiber, and the temperature of the drying and densification step may be between 100° C. and 200° C. After the drying and densification step, the nascent carbon fiber may be subjected to an extension step to extend the nascent carbon fiber by applying an extension ratio of 2 to 5 times. Specifically, the extension step can be performed by stretching the nascent carbon fiber a high-temperature hot roller, a high-temperature hot plate, or a high-temperature and high-pressure steam. After step S50 is completed, the carbon fiber precursor can be obtained.

Subsequently, in step S60, a calcination step is performed on the carbon fiber precursor to form the carbon fiber. The calcination step can be performed in a manner known in the industry, for example, it sequentially includes four steps, which are stabilization, carbonization, surface treatment, and starching steps. Specifically, the stabilization step is to make the carbon fiber precursor react in the air with an appropriate tension and a temperature of 200° C. to 300° C., and the fiber density of the carbon fiber precursor after the stabilization step can be between 1.3 $g/cm^3$ 1.4 $g/cm^3$; the carbonization step is to carbonize the carbon fiber precursor at a high temperature in a high-temperature inert gas, so as to improve the mechanical strength of the carbon fiber, the carbonization temperature can be between 1000° C. and 2000° C., and can further be between 2000° C. and 3000° C. for graphitization as deemed necessary; the surface treatment step can improve the bonding ability of carbon fiber and resin, which includes chemical grafting, plasma, electrolysis, ozone treatments, etc., preferably plasma treatment; the starching step is to wash and dry the carbon fiber precursor after surface treatment, and then to make the slurry adhere to the surface of the carbon fiber precursor by means of dipping, such that the carbon fiber has good wear resistance, aggregation, and other protective effects. After the step S60 is completed, the carbon fiber with high mechanical strength of the present disclosure can be obtained.

The features and effects of the present disclosure will be described in more detail below with reference to the carbon fibers of each embodiment and each comparative example. It should be understood that the materials used, their amounts and ratios, processing details and processing flow, etc. may be appropriately changed without departing from the scope of the present disclosure. Therefore, the present disclosure should not be limited by the embodiments described below. The detailed description of each embodiment and each comparative example is as follows.

The manufacturing method for the carbon fiber of each embodiment and each comparative example includes the following steps. 98 wt % of acrylonitrile was used as the first monomer and 2 wt % of itaconic acid was used as the second monomer to carry out a polymerization reaction in the first solvent to form a copolymerized polymer. After the solution containing the copolymerized polymer (spinning solution) was spit out from the spinning nozzle in the air, the nascent carbon fiber was formed in a condensing bath with an aqueous solution of 35 wt % dimethyl sulfoxide and a condensing temperature of 3° C. After the washing step for the nascent carbon fiber is performed, the extension step with a total extension ratio of 3.5 times was carried out through two stages in boiling water. The nascent carbon fiber was oiled in an oil tank with oil of 1.5 wt % and a temperature of 30° C. The nascent carbon fiber that is oiled was dried and densified with a hot roller at a temperature of 175° C. The nascent carbon fiber was subjected to an extension step of with an extension ratio of 3.5 times in high pressure steam, thereby forming a carbon fiber precursor. The carbon fiber precursor was gradually heated from 240° C. to 280° C. in the air, and the speed ratio of the front and rear traction rollers was controlled to be 1.0 to perform the stabilization step under the condition of maintaining the tension of the carbon fiber precursor, and the fiber density of the stabilized carbon fiber precursor is 1.35 g/cm³. The stabilized carbon fiber precursor was gradually heated up from 300° C. to 800° C. in nitrogen, and the speed ratio of the front and rear traction rollers was controlled to be 0.9 for low-temperature carbonization, and then the temperature was gradually raised from 900° C. to 1800° C., and the speed ratio of the front and rear traction rollers was controlled to be 0.95 for high-temperature carbonization. An electrolytic surface treatment is performed on the carbonized carbon fiber precursor. The surface-treated carbon fiber precursor was washed with water, dried and starched to obtain the carbon fiber. The detailed description of the first solvent used in the polymerization reaction, the characteristics of the copolymerized polymer, and the content of the copolymerized polymer in the spinning solution are shown in Table 1.

Experiment 1: Spinnability Test of Copolymer

In this experiment, the measurement of the continuous spinning time of the copolymerized polymers of each embodiment and each comparative example was carried out to conduct a spinnability test. The test results are shown in Table 2.

TABLE 2

| | continuous spinning time (hour) |
|---|---|
| comparative example 1 | 1 |
| comparative example 2 | 1 |
| comparative example 3 | 48 |
| comparative example 4 | 60 |
| comparative example 5 | 80 |
| embodiment 1 | 98 |
| embodiment 2 | 108 |
| embodiment 3 | 120 |

It can be seen from the test results that, compared with the comparative examples, the copolymerized polymer of each embodiment obviously have a longer continuous spinning time, indicating that the copolymerized polymer produced by the method of the present disclosure have better spinnability.

Experiment 2: Hairiness Test of Nascent Carbon Fiber

In this experiment, the nascent carbon fibers of each embodiment and each comparative example were crimped into bundles, and the hairiness number of 1000 m of the nascent carbon fibers was calculated to conduct the hairiness test. The test results are shown in Table 3.

TABLE 3

| | test result of hairiness (hairiness number) |
|---|---|
| comparative example 1 | level 5 (hairiness number ≥ 60) |
| comparative example 2 | level 5 (hairiness number ≥ 60) |

TABLE 1

| | first solvent | | | | | characteristics of copolymerized polymer | | |
|---|---|---|---|---|---|---|---|---|
| | DMSO (wt %) | DMS (wt %) | MSM (wt %) | acid value (KOH mg/g) | base value (HClO$_4$ mg/g) | falling ball viscosity (s) | polymerization conversion degree (%) | concentration of copolymerized polymer (wt %) |
| comparative example 1 | 94.0000 | 0.0005 | 0.0008 | 2.50 | 0.70 | 350 | 84 | 17.9 |
| comparative example 2 | 98.3000 | 0.0150 | 0.0100 | 2.10 | 0.59 | 390 | 85 | 18.1 |
| comparative example 3 | 99.7000 | 0.0120 | 0.0080 | 1.50 | 0.40 | 410 | 87 | 18.5 |
| comparative example 4 | 99.8800 | 0.0050 | 0.0030 | 0.90 | 0.20 | 460 | 88 | 18.7 |
| comparative example 5 | 99.8850 | 0.0035 | 0.0018 | 0.40 | 0.10 | 510 | 89 | 18.9 |
| embodiment 1 | 99.8980 | 0.0012 | 0.0008 | 0.10 | 0.01 | 600 | 88 | 19.1 |
| embodiment 2 | 99.9084 | 0.0010 | 0.0006 | 0.05 | 0.01 | 620 | 90 | 19.3 |
| embodiment 3 | 99.9088 | 0.0008 | 0.0004 | 0.02 | 0.01 | 650 | 92 | 19.5 |

Note 1:
The test of the falling ball viscosity is to pour the copolymerized polymer into a test tube having a length of 30 cm and a diameter of 2 cm. After placing the test tube at 45° C. for 15 minutes, a steel ball with a diameter of 0.1 cm is dropped into the test tube, and the falling time of the steel ball within the range of 20 cm is recorded with a stopwatch.

Note 2:
Polymerization conversion degree = [concentration of copolymerized polymer/concentration of first (second) monomer] × 100%.

Note 3:
The concentration of the copolymerized polymer refers to the weight of the copolymerized polymer when based on the total weight of the spinning solution.

TABLE 3-continued

| | test result of hairiness (hairiness number) |
|---|---|
| comparative example 3 | level 4 (5 < hairiness number < 60) |
| comparative example 4 | level 3 (2 < hairiness number < 5) |
| comparative example 5 | level 2 (1 < hairiness number ≤ 2) |
| embodiment 1 | level 2 (1 < hairiness number ≤ 2) |
| embodiment 2 | level 1 (hairiness number ≤ 1) |
| embodiment 3 | level 1 (hairiness number ≤ 1) |

It can be seen from the test results that, compared with the comparative examples, the nascent carbon fiber of each embodiment obviously produced fewer hairiness numbers, showing relatively stable structural properties.

Experimental Example 3: Strength Test of Carbon Fiber

In this experiment, the standard method ASTM D4018-99 was conducted to test the strength of carbon fibers in each embodiment and each comparative example, and the test results are shown in Table 4.

TABLE 4

| | strength (KSI) |
|---|---|
| comparative example 1 | 350 |
| comparative example 2 | 370 |
| comparative example 3 | 440 |
| comparative example 4 | 510 |
| comparative example 5 | 610 |
| embodiment 1 | 710 |
| embodiment 2 | 750 |
| embodiment 3 | 780 |

It can be seen from the test results that, compared with the comparative examples, the carbon fiber of each embodiment obviously has higher strength, showing better fiber strength.

According to the aforementioned embodiments of the present disclosure, since the first solvent of the present disclosure has a high content of dimethyl sulfoxide, the purity of the first solvent is high, such that the copolymerized polymer formed in the first solvent can have good performance in purity, molecular weight, spinnability, crystallinity, polymerization conversion degree, mechanical strength, and other properties. In addition, by adjusting the acid value and base value of the first solvent, the polymerization conversion degree of the polymerization reaction, the falling ball viscosity, the molecular weight, and the dispersibility index of the copolymerized polymer, the carbon fiber of the present disclosure can further have better mechanical strength, thereby having a wider application.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method for a carbon fiber, comprising:
dissolving a first monomer and a second monomer in a first solvent and performing a polymerization reaction to form a copolymerized polymer, wherein the first monomer comprises acrylonitrile, the second monomer has an unsaturated bond, the first solvent comprises dimethyl sulfoxide, methylsulfonylmethane, and dimethyl sulfide, based on 100 wt % of the first solvent, a content of the dimethyl sulfoxide is between 99.9 wt % and 100 wt %, a content of the methylsulfonylmethane is less than or equal to 0.0004 wt %, and a content of the dimethyl sulfide is less than or equal to 0.0008 wt %; and
performing a spinning step on the copolymerized polymer.

2. The manufacturing method for the carbon fiber of claim 1, wherein the acid value of the first solvent is less than or equal to 0.02 KOH mg/g, and the base value of the first solvent is less than or equal to 0.01 HClO$_4$ mg/g.

3. The manufacturing method for the carbon fiber of claim 1, wherein a polymerization conversion degree of the polymerization reaction is between 90% and 100%.

4. The manufacturing method for the carbon fiber of claim 1, wherein a falling ball viscosity of the copolymerized polymer is between 400 seconds and 700 seconds.

5. The manufacturing method for the carbon fiber of claim 1, wherein a weight-average molecular weight of the copolymerized polymer is between 300,000 g/mole and 500,000 g/mole.

6. The manufacturing method for the carbon fiber of claim 1, wherein a dispersibility index of the copolymerized polymer is between 1.5 and 3.0.

7. The manufacturing method for the carbon fiber of claim 1, further comprising:
dissolving the copolymerized polymer in a second solvent, wherein a weight percent concentration of the copolymerized polymer in the second solvent is between 18% and 25%.

8. The manufacturing method for the carbon fiber of claim 7, wherein the spinning step comprises:
performing a reeling-off step on the copolymerized polymer dissolved in the second solvent to form a filamentous copolymerized polymer; and
performing a condensing step on the filamentous copolymerized polymer by using a condensing bath to form a nascent carbon fiber, wherein the condensing bath contains a condensing liquid, the condensing liquid comprises the dimethyl sulfoxide, and based 100 wt % of the condensing liquid, a content of the dimethyl sulfoxide is between 20 wt % and 50 wt %.

9. The manufacturing method for the carbon fiber of claim 1, wherein based on 100 wt % of the first monomer and the second monomer, a content of the first monomer is between 95 wt % and 100 wt %.

10. A manufacturing method for a carbon fiber, comprising:
dissolving a first monomer and a second monomer in a first solvent and performing a polymerization reaction to form a copolymerized polymer, wherein based on 100 wt % of the first monomer and the second monomer, a content of the first monomer is between 99 wt % and 100 wt %, the first solvent comprises dimethyl sulfoxide, methylsulfonylmethane, and dimethyl sulfide, based on 100 wt % of the solvent, a content of the dimethyl sulfoxide is between 99.9 wt % and 100 wt % a content of the methylsulfonylmethane is less than or equal to 0.0004 wt %, and a content of the dimethyl sulfide is less than or equal to 0.0008 wt %; and
performing a spinning step on the copolymerized polymer.

11. The manufacturing method for the carbon fiber of claim 10, wherein the first monomer comprises acrylonitrile, and the second monomer has an unsaturated bond.

12. The manufacturing method for the carbon fiber of claim 10, wherein the acid value of the first solvent is less than or equal to 0.02 KOH mg/g, and the base value of the first solvent is less than or equal to 0.01 $HClO_4$ mg/g.

13. The manufacturing method for the carbon fiber of claim 10, wherein a polymerization conversion degree of the polymerization reaction is between 90% and 100%.

14. The manufacturing method for the carbon fiber of claim 10, wherein a falling ball viscosity of the copolymerized polymer is between 400 seconds and 700 seconds.

15. The manufacturing method for the carbon fiber of claim 10, wherein a weight-average molecular weight of the copolymerized polymer is between 300,000 g/mole and 500,000 g/mole.

16. The manufacturing method for the carbon fiber of claim 10, wherein a dispersibility index of the copolymerized polymer is between 1.5 and 3.0.

17. The manufacturing method for the carbon fiber of claim 10, further comprising:
    dissolving the copolymerized polymer in a second solvent, wherein a weight percent concentration of the copolymerized polymer in the second solvent is between 18% and 25%.

18. The manufacturing method for the carbon fiber of claim 17, wherein the spinning step comprises:
    performing a reeling-off step on the copolymerized polymer dissolved in the second solvent to form a filamentous copolymerized polymer; and
    performing a condensing step on the filamentous copolymerized polymer by using a condensing bath to form a nascent carbon fiber, wherein the condensing bath contains a condensing liquid, the condensing liquid comprises the dimethyl sulfoxide, and based 100 wt % of the condensing liquid, a content of the dimethyl sulfoxide is between 20 wt % and 50 wt %.

* * * * *